United States Patent
Konishi

(10) Patent No.: US 11,242,045 B2
(45) Date of Patent: Feb. 8, 2022

(54) HYBRID VEHICLE

(71) Applicant: TOYOTA JIDOSHA KABUSHIKI KAISHA, Toyota (JP)

(72) Inventor: Jun Konishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 16/417,838

(22) Filed: May 21, 2019

(65) Prior Publication Data

US 2019/0389453 A1    Dec. 26, 2019

(30) Foreign Application Priority Data

Jun. 26, 2018  (JP) .............................. JP2018-120820

(51) Int. Cl.
| | | |
|---|---|---|
| B60L 9/00 | (2019.01) | |
| B60L 11/00 | (2006.01) | |
| G05D 1/00 | (2006.01) | |
| G05D 3/00 | (2006.01) | |
| G06F 7/00 | (2006.01) | |
| G06F 17/00 | (2019.01) | |

(Continued)

(52) U.S. Cl.
CPC .............. *B60W 20/15* (2016.01); *B60K 6/26* (2013.01); *B60K 6/365* (2013.01); *B60K 6/40* (2013.01); *B60K 6/445* (2013.01); *B60W 10/06* (2013.01); *B60W 10/08* (2013.01); *B60K 2006/268* (2013.01); *B60W 2510/0623* (2013.01); *B60W 2510/0638* (2013.01); *B60W 2510/083* (2013.01); *B60W 2710/0627* (2013.01); *B60W 2710/0644* (2013.01); *B60Y 2200/92* (2013.01)

(58) Field of Classification Search
CPC ...... B60W 20/15; B60W 10/06; B60W 10/08; B60W 2510/0623; B60W 2510/083; B60W 2710/0627; B60W 2710/0644; B60K 6/26; B60K 6/365; B60K 6/40; B60K 6/445; B60K 2006/268; B60Y 2200/92
USPC .......................................................... 701/22
See application file for complete search history.

(56) References Cited

U.S. PATENT DOCUMENTS

| | | | | |
|---|---|---|---|---|
| 2006/0100056 A1* | 5/2006 | Yamauchi | .............. | B60K 6/445 477/3 |
| 2010/0125019 A1* | 5/2010 | Tabata | ................. | B60W 10/115 477/3 |

(Continued)

FOREIGN PATENT DOCUMENTS

| | | |
|---|---|---|
| JP | 2004-360528 A | 12/2004 |
| JP | 2011-043141 A | 3/2011 |

(Continued)

*Primary Examiner* — Mahmoud S Ismail
(74) *Attorney, Agent, or Firm* — Oliff PLC

(57) ABSTRACT

There is provided a hybrid vehicle that suppresses the driver from feeling slow. At the time of a predetermined request that requires fuel injection of an engine in the state of motoring the engine under fuel cutting by a first motor at a rotation speed that is higher than an upper limit rotation speed during fuel injection of the engine, the hybrid vehicle waits until the rotation speed of the engine becomes equal to or lower than the upper limit rotation speed and then starts fuel injection of the engine. At the time of the predetermined request, the hybrid vehicle causes the rotation speed of the engine to be decreased by the first motor until the rotation speed of the engine becomes equal to or lower than the upper limit rotation speed.

5 Claims, 8 Drawing Sheets

(51) Int. Cl.
*B60W 20/15* (2016.01)
*B60K 6/365* (2007.10)
*B60K 6/26* (2007.10)
*B60K 6/40* (2007.10)
*B60K 6/445* (2007.10)
*B60W 10/06* (2006.01)
*B60W 10/08* (2006.01)

(56) References Cited

U.S. PATENT DOCUMENTS

| | | | |
|---|---|---|---|
| 2013/0179055 A1* | 7/2013 | Kato | F02N 19/004 |
| | | | 701/113 |
| 2016/0129903 A1 | 5/2016 | Takahashi | |
| 2016/0244047 A1* | 8/2016 | Tsuchida | B60W 10/06 |
| 2016/0257302 A1* | 9/2016 | Mitsutani | B60W 10/06 |
| 2017/0129477 A1* | 5/2017 | Ideshio | B60W 50/0205 |
| 2018/0072308 A1* | 3/2018 | Miyaishi | B60W 20/00 |

FOREIGN PATENT DOCUMENTS

| | | |
|---|---|---|
| JP | 2012-245961 A | 12/2012 |
| JP | 2012-254688 A | 12/2012 |
| JP | 2014-201105 A | 10/2014 |
| JP | 2014-201220 A | 10/2014 |
| JP | 2016-088380 A | 5/2016 |

* cited by examiner

HYBRID VEHICLE

CROSS-REFERENCE TO RELATED APPLICATIONS

The present disclosure claims priority to Japanese Patent Application No. 2018-120820 filed Jun. 26, 2018, which is incorporated herein by reference in its entirety including specification, drawings and claims.

TECHNICAL FIELD

The present disclosure relates to a hybrid vehicle and more specifically relates to a hybrid vehicle including an engine, a planetary gear, two motors and a power storage device.

BACKGROUND

In a hybrid vehicle configured such that a sun gear, a carrier and a ring gear of a planetary gear are respectively connected with a first motor, an engine and a driveshaft coupled with an axle, that a second motor is connected with the driveshaft, and that the first motor and the second motor transmit electric power to and from a battery, a proposed configuration changes the driving force of the driveshaft at a lower change rate when fuel injection of the engine is restarted in response to an accelerator operation to accelerate the hybrid vehicle in the case of motoring the engine by the first motor with stopping fuel injection of the engine, compared with the case of accelerating the hybrid vehicle in response to an accelerator operation during fuel injection (as described in, for example, JP 2014-201105A). Such control of the hybrid vehicle suppresses vibration of the vehicle that is likely to occur accompanied with an abrupt change in driving force of the driveshaft at the time of restart of fuel injection of the engine.

SUMMARY

When there is a requirement for fuel injection of the engine in the state of motoring the engine under fuel cutting by the first motor at a rotation speed that is higher than an upper limit rotation speed during fuel injection of the engine, the hybrid vehicle of this proposed configuration waits until the rotation speed of the engine becomes equal to or lower than the upper limit rotation speed and then starts fuel injection of the engine. When it takes a long time until the rotation speed of the engine becomes equal to or lower than the upper limit rotation speed, it takes a long time until the start of fuel injection of the engine. This extends a time period until the output of the driving force from the engine to the driveshaft via the planetary gear and may cause the driver to feel slow.

A main object of the hybrid vehicle of the present disclosure is to suppress the driver from feeling slow.

In order to achieve the above primary object, the hybrid vehicle of the present disclosure employs the following configuration.

The present disclosure is directed to a hybrid vehicle. The hybrid vehicle includes an engine, a first motor, a planetary gear including three rotational elements that are respectively connected with an output shaft of the engine, a rotating shaft of the first motor and a driveshaft which is coupled with an axle, a second motor configured to input and output power to and from the driveshaft, a power storage device configured to transmit electric power to and from the first motor and the second motor and a control device. At a time of a predetermined request that requires fuel injection of the engine in a state of motoring the engine under fuel cutting by the first motor at a rotation speed that is higher than an upper limit rotation speed during fuel injection of the engine, the control device waits until rotation speed of the engine becomes equal to or lower than the upper limit rotation speed and then starts fuel injection of the engine. Furthermore, at the time of the predetermined request, the control device causes the rotation speed of the engine to be decreased by the first motor until the rotation speed of the engine becomes equal to or lower than the upper limit rotation speed.

At the time of the predetermined request that requires fuel injection of the engine in the state of motoring the engine under fuel cutting by the first motor at the rotation speed that is higher than the upper limit rotation speed during fuel injection of the engine, the hybrid vehicle of this aspect waits until the rotation speed of the engine becomes equal to or lower than the upper limit rotation speed and then starts fuel injection of the engine. At the time of the predetermined request, the hybrid vehicle of this aspect causes the rotation speed of the engine to be decreased by the first motor until the rotation speed of the engine becomes equal to or lower than the upper limit rotation speed. This configuration shortens the time period before the rotation speed of the engine becomes equal to or lower than the upper limit rotation speed and shortens the time period before the start of fuel injection of the engine, compared with a configuration that does not cause the rotation speed of the engine to be decreased by the first motor. As a result, this configuration shortens the time period until the output of the driving force from the engine to the driveshaft via the planetary gear and suppresses the driver from feeling slow. At the time of fuel cutting of the engine, the control device may be configured to control the first motor such as to motor the engine in a range of not higher than a second upper limit rotation speed that is larger than the upper limit rotation speed.

DESCRIPTION OF EMBODIMENTS

The following describes some aspects of the disclosure with reference to embodiments.

Figure 1:
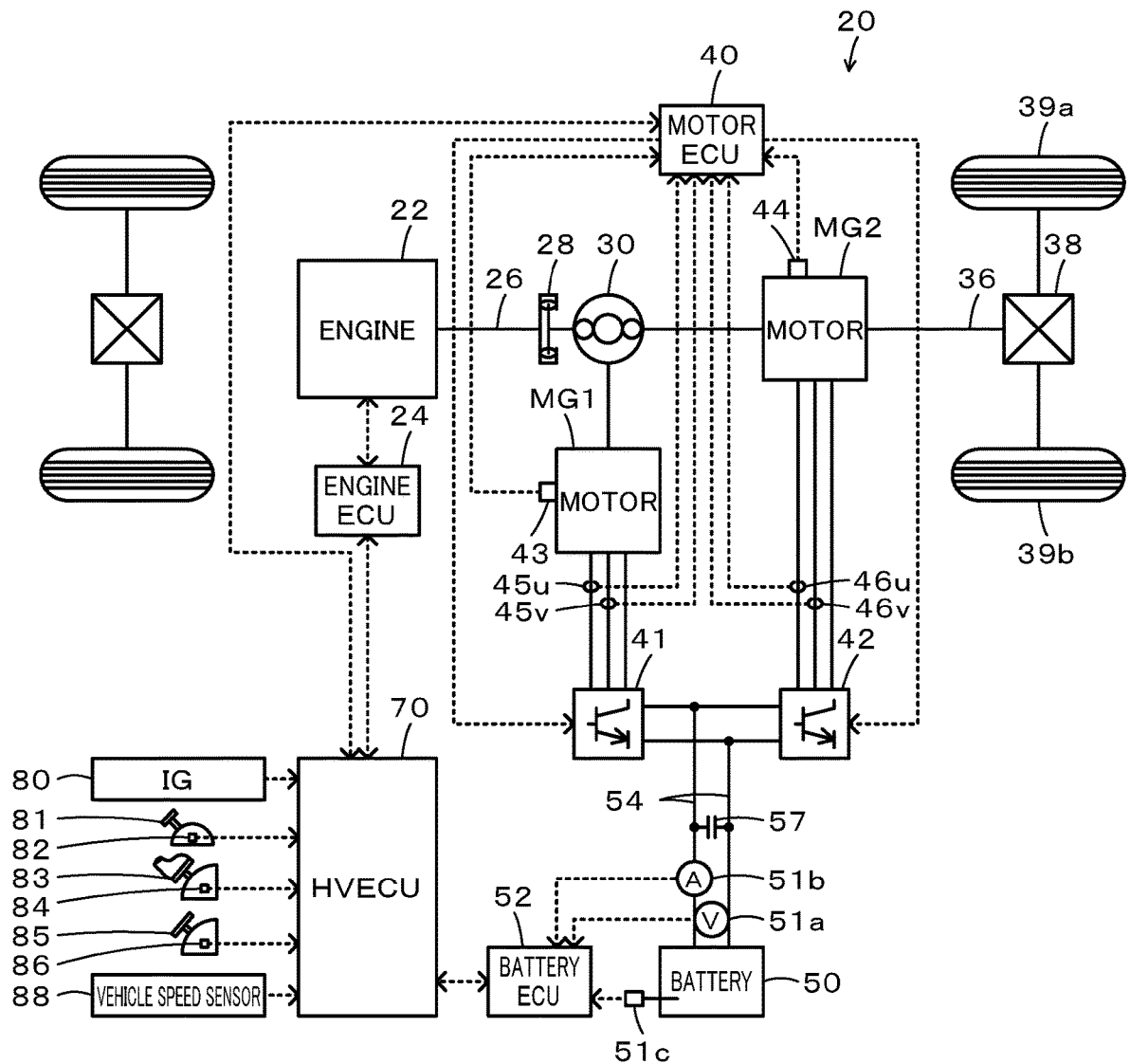
FIG. 1 is a configuration diagram illustrating the schematic configuration of a hybrid vehicle 20 according to one embodiment of the present disclosure.
Figure 2:
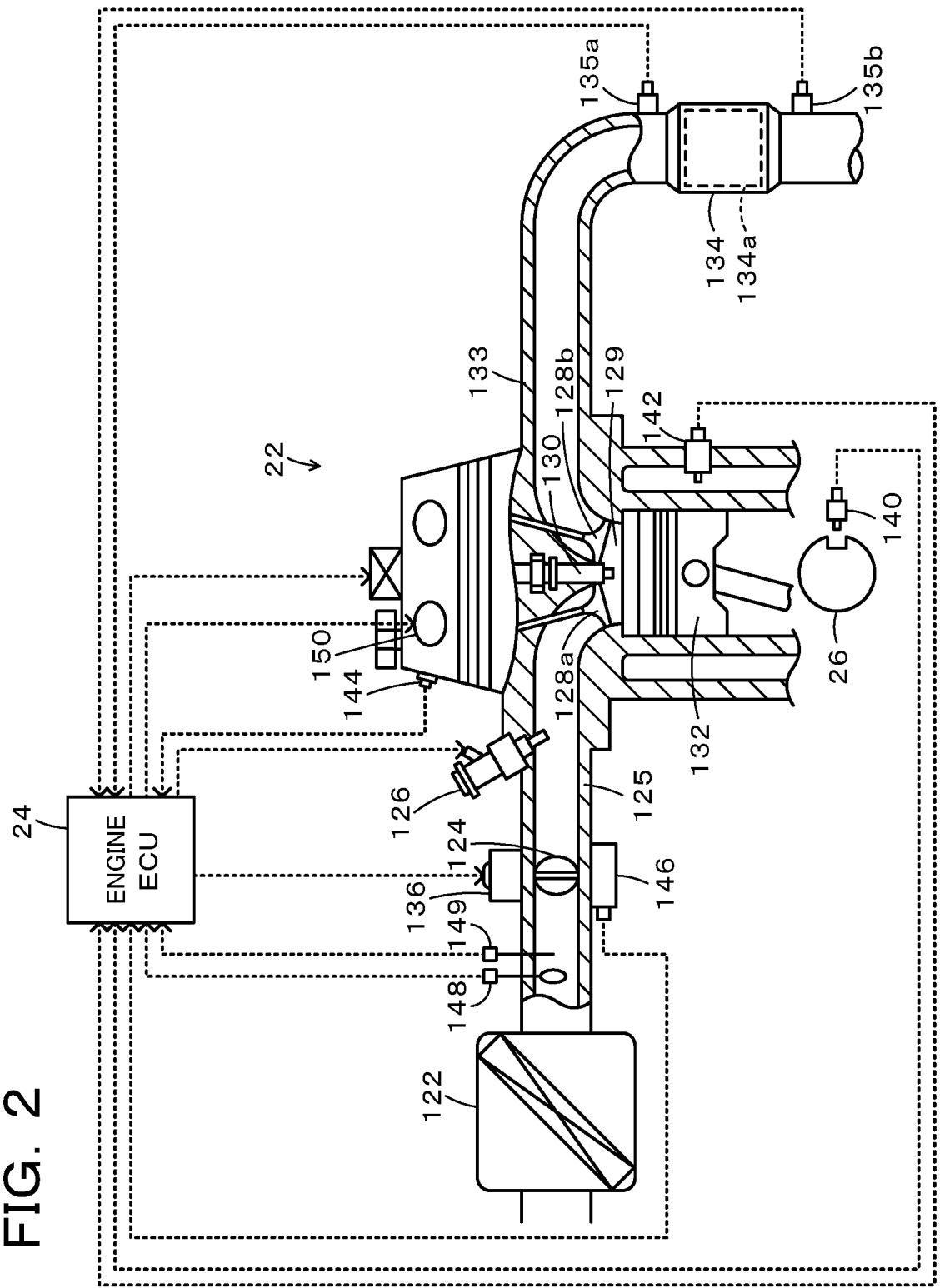
FIG. 2 is a configuration diagram illustrating the schematic configuration of an engine 22.

FIG. 1 is a configuration diagram illustrating the schematic configuration of a hybrid vehicle 20 according to one embodiment of the present disclosure. FIG. 2 is a configuration diagram illustrating the schematic configuration of an engine 22. As shown in FIG. 1, the hybrid vehicle 20 of the embodiment includes the engine 22, a planetary gear 30, motors MG1 and MG2, inverters 41 and 42, a battery 50 serving as a power storage device, and a hybrid electronic control unit (hereinafter, referred as "HVECU") 70.

The engine 22 is configured as an internal combustion engine that outputs power using, for example, gasoline or light oil as a fuel and has a crankshaft 26 that is connected with a carrier of the planetary gear 30 via a damper 28. In this engine 22, as shown in FIG. 2, the air cleaned by an air cleaner 122 and taken in via a throttle valve 124 provided in an intake pipe 125 is mixed with the fuel injected from a fuel injection valve 126. The air-fuel mixture is taken into a combustion chamber 129 via an intake valve 128a and is explosively combusted with an electric spark provided by a spark plug 130. The reciprocating motion of a piston 132 that is pressed down by the energy of the explosive combustion is converted into rotating motion of the crankshaft 26. The exhaust emission discharged from the combustion chamber 129 to an exhaust pipe 133 via an exhaust valve 128b is released to the outside air through an exhaust emission control device 134 filled with a catalyst (three-way catalyst) 134a serving to convert toxic components such as carbon monoxide (CO), hydrocarbons (HC) and nitrogen oxides (NOx) into less toxic components.

This engine 22 is operated and controlled by an engine electronic control unit (hereinafter referred to as "engine ECU") 24. The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle $\theta cr$ from a crank position sensor 140 configured to detect the rotational position of the crankshaft 26 and a cooling water temperature Tw from a water temperature sensor 142 configured to detect the temperature of cooling water of the engine 22. The input signals also include cam angles $\theta ci$ and $\theta co$ from a cam position sensor 144 configured to detect the rotational position of an intake cam shaft that is provided to open and close the intake valve 128a and to detect the rotational position of an exhaust cam shaft that is provided to open and close the exhaust valve 128b. The input signals further include a throttle position TH from a throttle valve position sensor 146 configured to detect the position of the throttle valve 124, an intake air flow Qa from an air flowmeter 148 mounted to the intake pipe 125, and an intake air temperature Ta from a temperature sensor 149 mounted to the intake pipe 125. The input signals additionally include an air-fuel ratio AF from an air-fuel ratio sensor 135a mounted on an upstream side of the exhaust emission control device 134 in the exhaust pipe 133 and an oxygen signal O2 from an oxygen sensor 135b mounted on a downstream side of the exhaust emission control device 134. Various control signals for operation control of the engine 22 are output from the engine ECU 24 via the output port. The signals output from the engine ECU 24 include, for example, a driving control signal to a throttle motor 136 provided to adjust the position of the throttle valve 124, a driving control signal to the fuel injection valve 126, a driving control signal to the spark plug 130, and a driving control signal to a variable valve timing mechanism 150 configured to vary the open-close timing of the intake valve 128a. The engine ECU 24 is connected with the HVECU 70 via the respective communication ports. The engine ECU 24 calculates a rotation speed Ne of the engine 22, based on the crank angle $\theta cr$ input from the crank position sensor 140. The engine ECU 24 also calculates an open-close timing VT of the intake valve 128a, based on an angle difference ($\theta ci - \theta cr$) of the cam angle $\theta ci$ of the intake cam shaft input from the cam position sensor 144 relative to the crank angle $\theta cr$ input from the crank position sensor 140. Furthermore, the engine ECU 24 estimates a temperature Tc of the catalyst 134a (catalyst temperature Tc) in the exhaust emission control device 134, based on the cooling water temperature Tw input from the water temperature sensor 142.

As shown in FIG. 1, the planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 are input into the motor ECU 40 via the input port. The signals input into the motor ECU 40 include, for example, rotational positions $\theta m1$ and $\theta m2$ from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2. The motor ECU 40 outputs via the output port, for example, switching control signals to the plurality of switching elements included in the respective inverters 41 and 42. The motor ECU 40 is connected with the HVECU 70 via the respective communication ports. The motor ECU 40 calculates electrical angles $\theta e1$ and $\theta e2$, angular velocities $\omega m1$ and $\omega m2$ and rotation speeds Nm1 and Nm2 of the respective motors MG1 and MG2, based on the rotational positions $\theta m1$ and $\theta m2$ of the respective rotors of the motors MG1 and MG2 input from the rotational position detection sensors 43 and 44.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above.

In the hybrid vehicle 20 of the embodiment, a parking position (P position), a reverse position (R position), a neutral position (N position), a drive position (D position) and a sequential position (S position) are provided as the shift position SP. The S position herein denotes a position used to change the driving force in an accelerator-on state or the braking force in an accelerator-off state according to the speed in a virtual speed change gear (for example, change in six levels corresponding to six speeds S1 to S6). This configuration gives the driver the feeling of speed change by the virtual speed change gear at the S position.

The hybrid vehicle 20 of the embodiment having the above configuration is driven in an electric drive mode (EV drive mode) without rotation of the engine 22 or in a hybrid drive mode (HV drive mode) with rotation of the engine 22.

Figure 3:
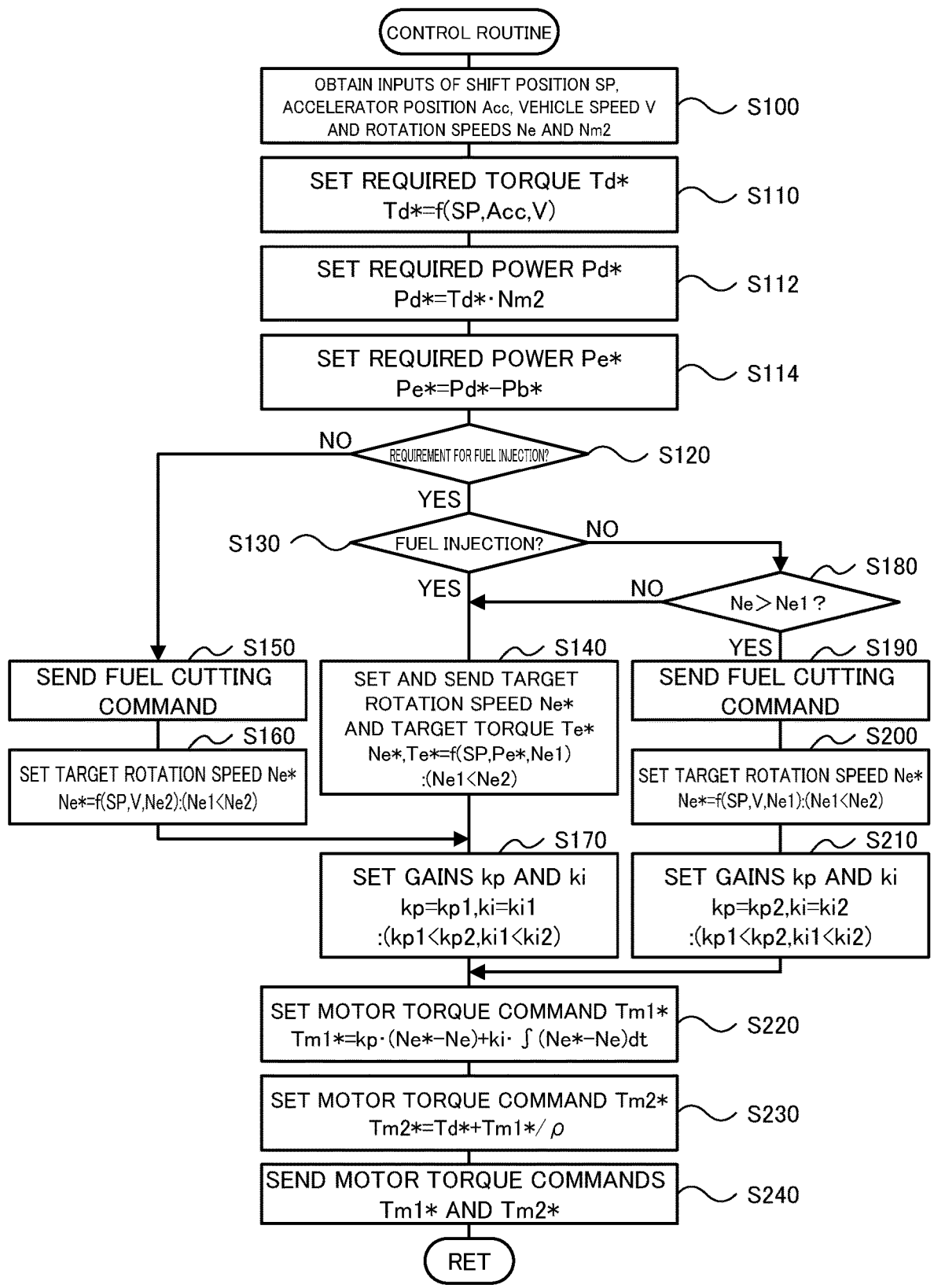
FIG. 3 is a flowchart showing one example of a control routine that is performed repeatedly by the HVECU 70 in the HV drive mode.

The following describes the operations of the hybrid vehicle 20 of the embodiment having the configuration described above or more specifically a series of operations when the hybrid vehicle 20 is driven in the HV drive mode. FIG. 3 is a flowchart showing one example of a control routine that is performed repeatedly by the HVECU 70 in the HV drive mode.

When the control routine of FIG. 3 is triggered, the HVECU 70 first obtains the input data such as the shift position SP, the accelerator position Acc, the vehicle speed V, the rotation speed Ne of the engine 22 and the rotation speed Nm2 of the motor MG2 (step S100). The input shift position SP is a position detected by the shift position sensor 82. The input accelerator position Acc is a value detected by the accelerator pedal position sensor 84. The input vehicle speed V is a value detected by the vehicle speed sensor 88. The input rotation speed Ne of the engine 22 is a value calculated by the engine ECU 24. The input rotation speed Nm2 of the motor MG2 is a value calculated by the motor ECU 40.

After obtaining the input data, the HVECU 70 sets a required torque Td* that is required for driving (i.e., required for the driveshaft 36), based on the input shift position SP, the input accelerator position Acc and the input vehicle speed V (step S110), and calculates a required power Pd* that is required for driving by multiplying the set required torque Td* by a rotation speed Nm2 of the motor MG2 (rotation speed Nd of the driveshaft 36) (step S112). The HVECU 70 then calculates a required power Pe* that is required for the engine 22 by subtracting a charge-discharge required power Pb* (which takes a positive value when the battery 50 is discharged) based on the state of charge SOC of the battery 50 from the calculated required power Pd* (step S114).

The HVECU 70 subsequently determines whether there is a requirement for fuel injection of the engine 22 (step S120). The condition used to require fuel injection of the engine 22 may be, for example, a condition that the required torque Td* is equal to or higher than a reference value Tdref, a condition that the required power Pd* is equal to or higher than a reference value Pdref, or a condition that the required power Pe* is equal to or higher than a reference value Peref.

When it is determined at step S120 that there is a requirement for fuel injection of the engine 22, the HVECU 70 subsequently determines whether fuel injection or fuel cutting of the engine 22 is performed (step S130). When it is determined that fuel injection of the engine 22 is performed, the HVECU 70 sets a target rotation speed Ne* of the engine 22 in a range of not higher than an upper limit rotation speed Ne1 and sets a target torque Te* of the engine 22, based on the shift position SP and the required power Pe*, and sends the settings of the target rotation speed Ne* and the target torque Te* of the engine 22 to the engine ECU 24 (step S140). The upper limit rotation speed Ne1 denotes a reference value used to determined whether fuel injection of the engine 22 is allowed or not. The upper limit rotation speed Ne1 is determined, for example, as an upper limit of a rotation speed range that is capable of suppressing overheat of the catalyst 134a in the process of fuel injection of the engine 22 (explosive combustion of the engine 22) and may be, for example, 4800 rpm, 5000 rpm or 5200 rpm. When the shift position SP is the D position, the target rotation speed Ne* and the target torque Te* of the engine 22 are set such that the engine 22 is operated with a high efficiency while being rotated in the range of not higher than the upper limit rotation speed Ne1. When the shift position SP is the S position, the target rotation speed Ne* and the target torque Te* of the engine 22 are set such that the engine 22 is operated with a certain level of efficiency while being rotated at the rotation speed increasing with a reduction in speed of the virtual speed change gear in the range of not higher than the upper limit rotation speed Ne1. When receiving the target rotation speed Ne* and the target torque Te* of the engine 22, the engine ECU 24 performs operation control of the engine 22 (for example, intake air flow control, fuel injection control and ignition control), such that the engine 22 is operated with the target rotation speed Ne* and the target torque Te*.

The HVECU 70 subsequently sets predetermined values kp1 and ki1 to gains kp and ki of a proportional and an integral term used for setting a torque command Tm1* of the motor MG1 (step S170), and uses the gains kp and ki of the proportional and the integral term to set the torque command Tm1* of the motor MG1 according to Expression (1) by rotation speed feedback control, such that the rotation speed Ne of the engine 22 is made closer to the target rotation speed Ne* (step S220):

$$Tm1^* = kp \cdot (Ne^* - Ne) + ki \cdot \int (Ne^* - Ne) dt \quad (1)$$

Figure 4:
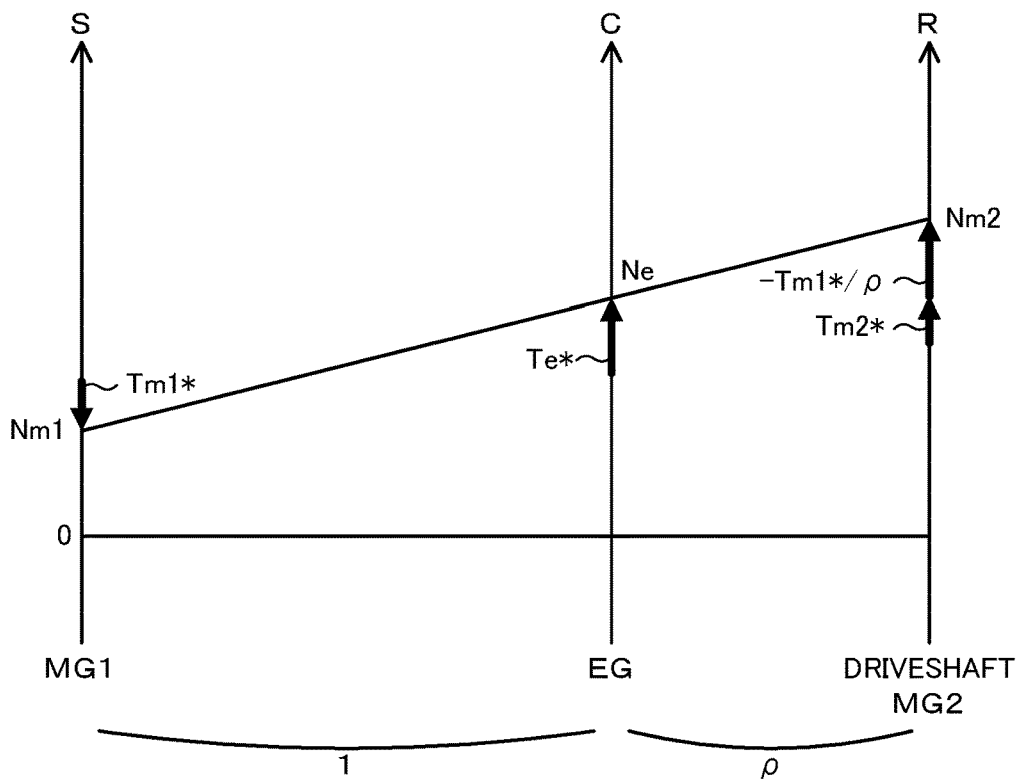
FIG. 4 is a diagram illustrating one example of an alignment chart in this state.

After setting the torque command Tm1* of the motor MG1 as described above, the HVECU 70 sets a torque command Tm2* of the motor MG2 according to Expression (2) by subtracting a torque (−Tm1*/ρ) that is output from the motor MG1 to be applied to the driveshaft 36 via the planetary gear 30 when the motor MG1 is driven with the torque command Tm1*, from the required torque Td* (step S230). The HVECU 70 sends the torque commands Tm1* and Tm2* of the motors MG1 and MG2 to the motor ECU 40 (step S240) and then terminates this control routine. When receiving the torque commands Tm1* and Tm2* of the motors MG1 and MG2, the motor ECU 40 performs switching control of the plurality of switching elements included in the inverters 41 and 42, such that the motors MG1 and MG2 are driven with the torque commands Tm1* and Tm2*. FIG. 4 is a diagram illustrating one example of an alignment chart in this state. In the alignment chart, an axis S on the left side indicates a rotation speed of the sun gear of the planetary gear 30 that is equal to the rotation speed Nm1 of the motor MG1. An axis C indicates a rotation speed of the carrier of the planetary gear 30 that is equal to the rotation speed Ne of the engine 22. An axis R indicates a rotation speed Nr of the ring gear of the planetary gear 30 that is equal to the rotation speed Nm2 of the motor MG2 (rotation speed Nd of the driveshaft 36). In the alignment chart, "ρ" denotes a gear ratio of the planetary gear 30 (number of teeth of the sun gear/number of teeth of the ring gear). In FIG. 4, the direction of the torque command Tm2* of the motor MG2 is determined according to the relationship between the required torque Td* and the torque (−Tm1*/ρ).

$$Tm2^* = Td^* - (-Tm1^*/\rho) \quad (2)$$

When it is determined at step S120 that there is no requirement for fuel injection of the engine 22, on the other hand, the HVECU 70 sends a fuel cutting command to the engine ECU 24 (step S150). When receiving the fuel cutting command, the engine ECU 24 performs fuel cutting of the engine 22 (keeps fuel cutting when fuel cutting has already started).

The HVECU 70 subsequently sets the target rotation speed Ne* of the engine 22 in a range of not higher than an upper limit rotation speed Ne2, based on the shift position SP and the vehicle speed V (step S160). The upper limit rotation speed Ne2 is determined as a larger value than the upper limit rotation speed Ne1, such as to further increase the braking force applied to the driveshaft 36 in the state of motoring the engine 22 under fuel cutting by the motor MG1 and may be, for example, 5800 rpm, 6000 rpm or 6200 rpm. When the shift position SP is the D position, the target rotation speed Ne* of the engine 22 is set to increase with an increase in vehicle speed V in the range of not higher than the upper limit rotation speed Ne2. When the shift position SP is the S position, the target rotation speed Ne* of the engine 22 is set to increase with an increase in vehicle speed V and to increase with a reduction in speed of the virtual speed change gear in the range of not higher than the upper limit rotation speed Ne2.

Figure 5:
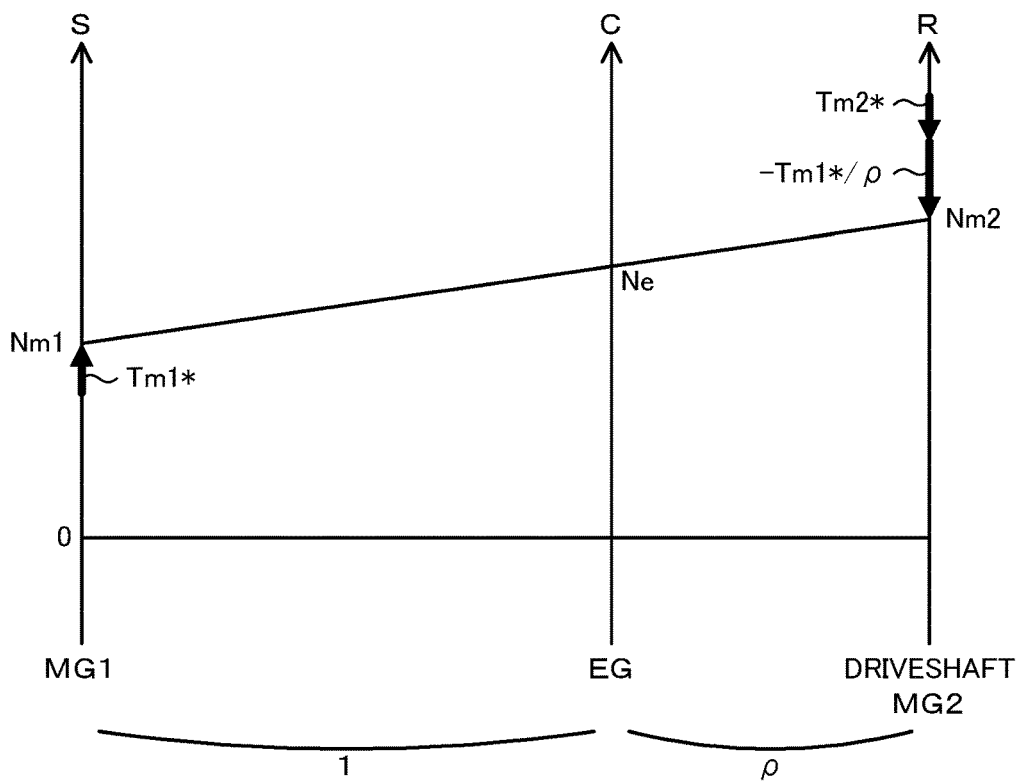
FIG. 5 is a diagram illustrating one example of an alignment chart in this state.

The HVECU 70 then performs the processing of step S170 and steps S220 to S240 described above and terminates this control routine. FIG. 5 is a diagram illustrating one example of an alignment chart in this state. As in FIG. 4, in FIG. 5, the direction of the torque command Tm2* of the motor MG2 is determined according to the relationship between the required torque Td* and the torque (−Tm1*/ρ).

When it is determined at step S120 that there is a requirement for fuel injection of the engine 22 and it is subsequently determined at step S130 that fuel cutting of the engine 22 is performed, the HVECU 70 compares the rotation speed Ne of the engine 22 with the upper limit rotation speed Ne1 described above (step S180). It is determined at step S180 that the rotation speed Ne of the engine 22 is higher than the upper limit rotation speed Ne1, for example, when the rotation speed Ne of the engine 22 is still higher than the upper limit rotation speed Ne1, irrespective of a requirement for fuel injection of the engine 22 in the state of motoring the engine 22 under fuel cutting by the motor MG1 at a rotation speed that is higher than the upper limit rotation speed Ne1.

When it is determined at step S180 that the rotation speed Ne of the engine 22 is higher than the upper limit rotation speed Ne1, the HVECU 70 determines that fuel injection of the engine 22 is not allowed and sends the fuel cutting command to the engine ECU 24 (step S190). The HVECU 70 subsequently sets the target rotation speed Ne* of the engine 22 in the range of not higher than the upper limit rotation speed Ne1, based on the shift position SP and the vehicle speed V (step S200). When the shift position SP is the D position, the target rotation speed Ne* of the engine 22 is set to increase with an increase in vehicle speed V in the range of not higher than the upper limit rotation speed Ne1. When the shift position SP is the S position, the target rotation speed Ne* of the engine 22 is set to increase with an increase in vehicle speed V and to increase with a reduction in speed of the virtual speed change gear in the range of not higher than the upper limit rotation speed Ne1.

Figure 6:
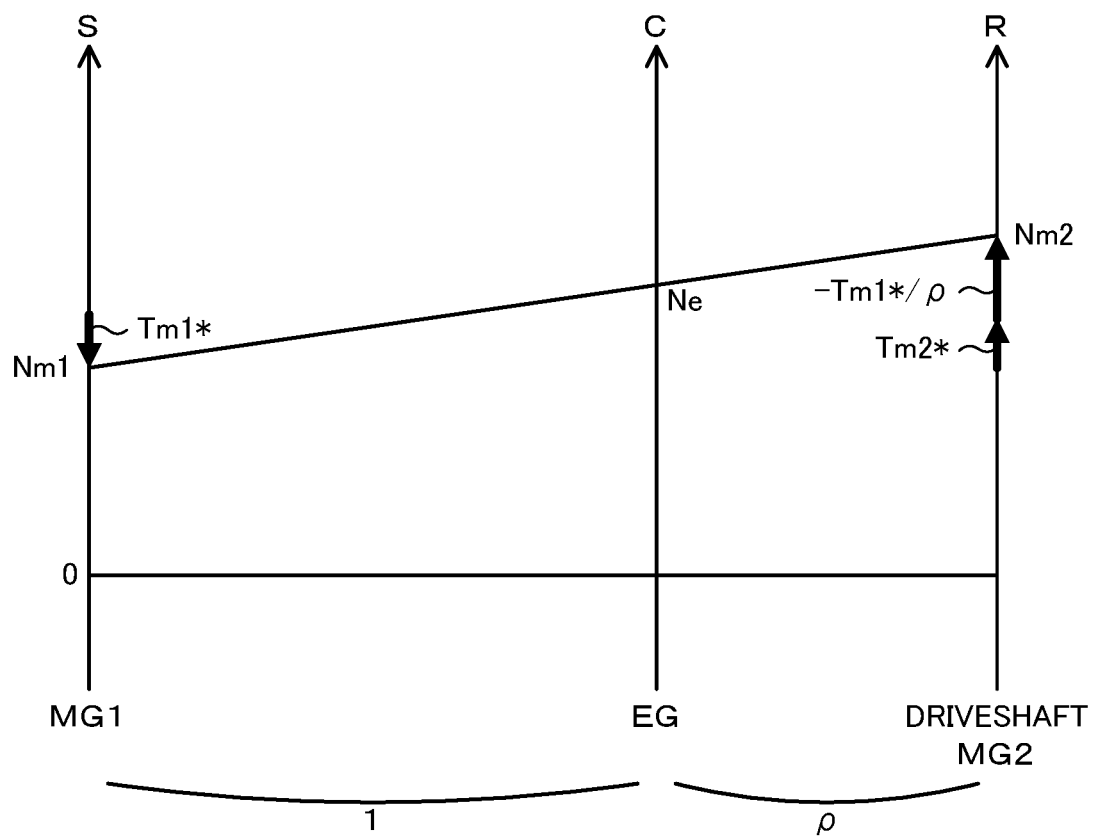
FIG. 6 is a diagram illustrating one example of an alignment chart in this state.

The HVECU 70 subsequently sets predetermined values kp2 and ki2 that are larger than the predetermined values kp1 and ki1, to the gains kp and ki of the proportional and the integral term (step S210) and then sets the torque command Tm1* of the motor MG1 by the processing of step S220 described above. The HVECU 70 then performs the processing of steps S230 and S240 described above and terminates this control routine. FIG. 6 is a diagram illustrating one example of an alignment chart in this state. As in FIG. 4 and FIG. 5, in FIG. 6, the direction of the torque command Tm2* of the motor MG2 is determined according to the relationship between the required torque Td* and the torque (−Tm1*/ρ).

It is assumed that the rotation speed Ne of the engine 22 is higher than the upper limit rotation speed Ne1 and that a value of not higher than the upper limit rotation speed Ne1 is set to the target rotation speed Ne* of the engine 22. Setting the torque command Tm1* of the motor MG1 by rotation speed feedback control causes the torque command Tm1* of the motor MG1 to take a negative value (i.e., a value in the direction of decreasing the rotation speed Ne of the engine 22). Additionally, using the predetermined values kp2 and ki2 as the gains kp and ki of the proportional and the integral term in rotation speed feedback control increases the torque command Tm1* of the motor MG1 toward the negative side (i.e., toward decreasing the rotation speed Ne of the engine 22), compared with using the predetermined values kp1 and ki1 as the gains kp and ki. This increases the amount of reduction in rotation speed Ne of the engine 22 per unit time and thereby shortens a time period until the rotation speed Ne of the engine 22 becomes equal to or lower than the upper limit rotation speed Ne1, i.e., a time period until fuel injection of the engine 22 is allowed.

When the rotation speed Ne of the engine 22 is equal to or lower than the upper limit rotation speed Ne1 at step S180, the HVECU 70 determines that fuel injection of the engine 22 is allowed. The HVECU 70 accordingly performs the processing of step S140, step S170 and steps S220 to S240 described above and then terminates this control routine. Accordingly, when there is a requirement for fuel injection of the engine 22 in the state of motoring the engine 22 under fuel cutting by the motor MG1 at the rotation speed that is higher than the upper limit rotation speed Ne1, fuel injection of the engine 22 is started (or restarted) after the rotation speed Ne of the engine 22 becomes equal to or lower than the upper limit rotation speed Ne1.

Figure 7:
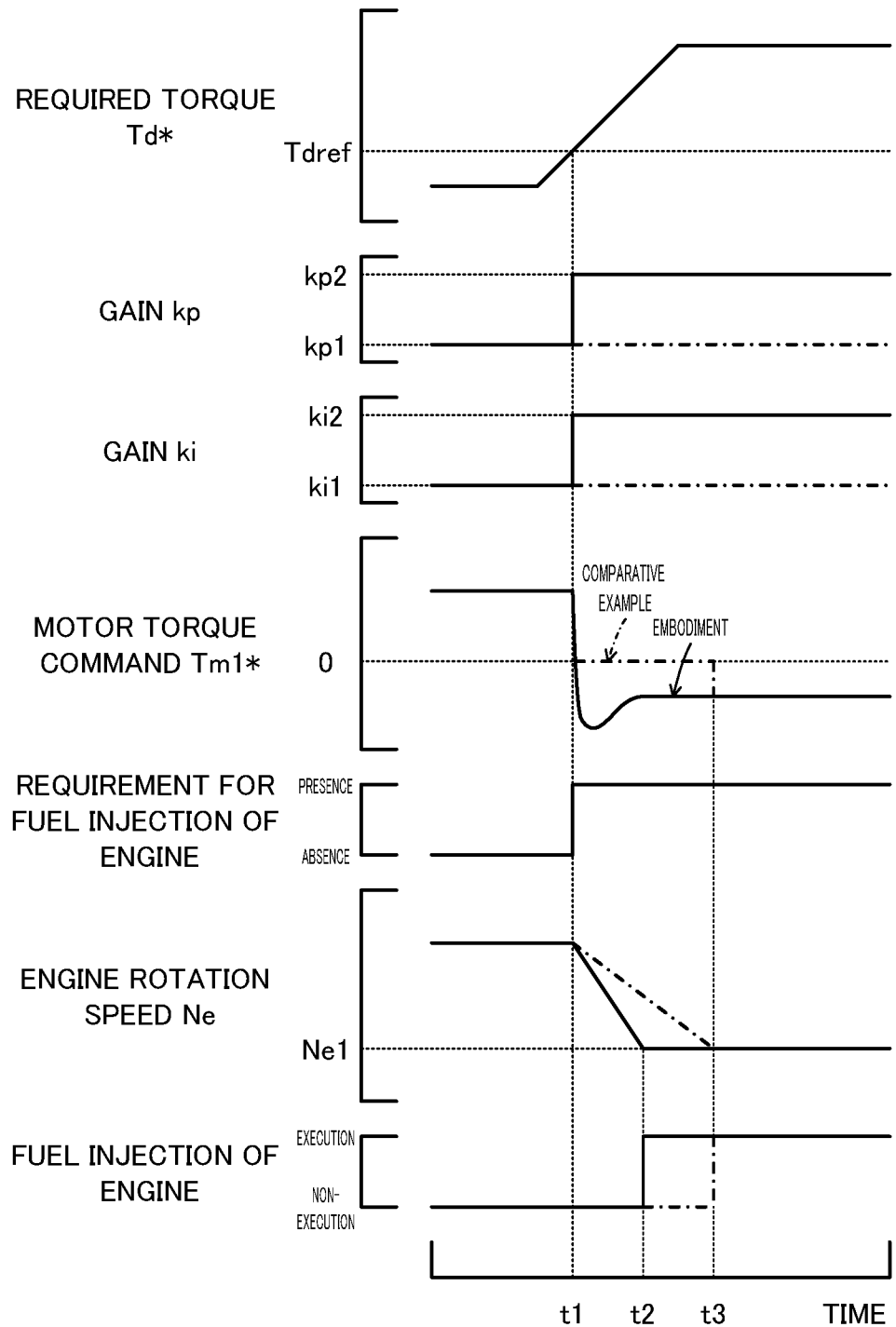
FIG. 7 is a diagram illustrating one example of the state when there is a requirement for fuel injection of the engine 22 in the course of motoring the engine under fuel cutting by the motor MG1 at a rotation speed that is higher than an upper limit rotation speed Ne1.

FIG. 7 is a diagram illustrating one example of variations in the required torque Td*, the gains kp and ki of the proportional and the integral term in rotation speed feedback control, the torque command Tm1* of the motor MG1, and the rotation speed Ne of the engine 22 in response to a requirement for fuel injection of the engine 22 in the state of motoring the engine 22 under fuel cutting by the motor MG1 at the rotation speed that is higher than the upper limit rotation speed Ne1; the presence or the absence of a requirement for fuel injection of the engine 22; and the execution or non-execution of fuel injection of the engine 22. In the diagram, solid line curves indicate an embodiment and one-dot chain line curves indicate a comparative example, with regard to the gains kp and ki in rotation speed feedback control, the torque command Tm1* of the motor MG1, the rotation speed Ne of the engine 22 and the execution or non-execution of fuel injection of the engine 22. In the comparative example, the motor MG1 is controlled with setting a value 0 to the torque command Tm1* of the motor MG1 without rotation speed feedback control for a time period from the time when a requirement for fuel injection of the engine 22 starts to the time when the rotation speed Ne of the engine 22 becomes equal to or lower than the upper limit rotation speed Ne1. In other words, the comparative example does not cause the rotation speed Ne of the engine 22 to be decreased by the motor MG1 (the comparative example waits until the rotation speed Ne of the engine 22 becomes equal to or lower than the upper limit rotation speed Ne1 by the friction of the engine 22).

In the comparative example, at a time t1, the required torque Td* becomes equal to or higher than the reference value Tdref, and a requirement for fuel injection of the engine 22 starts. At a subsequent time t3, the rotation speed Ne of the engine 22 becomes equal to or lower than the upper limit rotation speed Ne1. It takes a relatively long time from the start of a requirement for fuel injection of the engine 22 to the start of actual fuel injection of the engine 22. When the requirement for fuel injection of the engine 22 starts at the time t1, the embodiment, on the other hand, increases the torque command Tm1* of the motor MG1 toward the negative side and increases the amount of reduction in rotation speed Ne of the engine 22 per unit time, compared with the comparative example. Accordingly, the rotation speed Ne of the engine 22 becomes equal to or lower than the upper limit rotation speed Ne1 at a time t2 prior to the time t3. This shortens the time period from the start of the requirement for fuel injection of the engine 22 to the start of actual fuel injection of the engine 22. It is expected that the requirement for fuel injection of the engine 22 is started due to an increase in the required torque Td* when the driver depresses the accelerator pedal 83. Shortening the time period before the start of actual fuel injection of the engine 22 shortens a time period before the driving force is output from the engine 22 to the driveshaft 36 via the planetary gear 30 (i.e., a time period required for a shift from the state of FIG. 5 through the state of FIG. 6 to the state of FIG. 4) and suppresses the driver from feeling slow.

As described above, when there is a requirement for fuel injection of the engine 22 in the state of motoring the engine 22 under fuel cutting by the motor MG1 at the rotation speed that is higher than the upper limit rotation speed Ne1, the hybrid vehicle 20 of the embodiment waits until the rotation speed Ne of the engine 22 becomes equal to or lower than the upper limit rotation speed Ne1 and then starts (restarts) fuel injection of the engine 22. The larger gains kp and ki of the proportional and the integral term in rotation speed feedback control are provided until the rotation speed Ne of the engine 22 becomes equal to or lower than the upper limit rotation speed Ne1, compared with the gains kp and ki provided after the rotation speed Ne of the engine 22 becomes equal to or lower than the upper limit rotation speed Ne1. This increases the torque command Tm1* of the motor MG1 toward the negative side and increases the amount of reduction in rotation speed Ne of the engine 22 per unit time. This accordingly shortens the time period before the rotation speed Ne of the engine 22 becomes equal to or lower than the upper limit rotation speed Ne1 and shortens the time period before the start of actual fuel injection of the engine 22. As a result, this shortens the time period before the driving force is output from the engine 22 to the driveshaft 36 via the planetary gear 30 and suppresses the drive from feeling slow.

When there is a requirement for fuel injection of the engine 22 in the state of motoring the engine 22 under fuel cutting by the motor MG1 at the rotation speed that is higher than the upper limit rotation speed Ne1, the hybrid vehicle 20 of the embodiment provides the larger gains kp and ki of the proportional and the integral term in rotation speed feedback control until the rotation speed Ne of the engine 22 becomes equal to or lower than the upper limit rotation speed Ne1, compared with the gains kp and ki provided after the rotation speed Ne of the engine 22 becomes equal to or lower than the upper limit rotation speed Ne1. A modification may provide the same settings of the gains kp and ki of the proportional and the integral term in rotation speed feedback control before the rotation speed Ne of the engine 22 becomes equal to or lower than the upper limit rotation speed Ne1 and after the rotation speed Ne of the engine 22 becomes equal to or lower than the upper limit rotation speed Ne1. This modified configuration also causes the rotation speed Ne of the engine 22 to be decreased by the motor MG1 until the rotation speed Ne of the engine 22 becomes equal to or lower than the upper limit rotation speed Ne1 (as shown in steps S200 and S220). The modified configuration accordingly shortens the time period before the rotation speed Ne of the engine 22 becomes equal to or lower than the upper limit rotation speed Ne1, compared with a configuration that does not cause the rotation speed Ne of the engine 22 to be decreased by the motor MG1 (as shown in the comparative example of FIG. 7).

Figure 8:
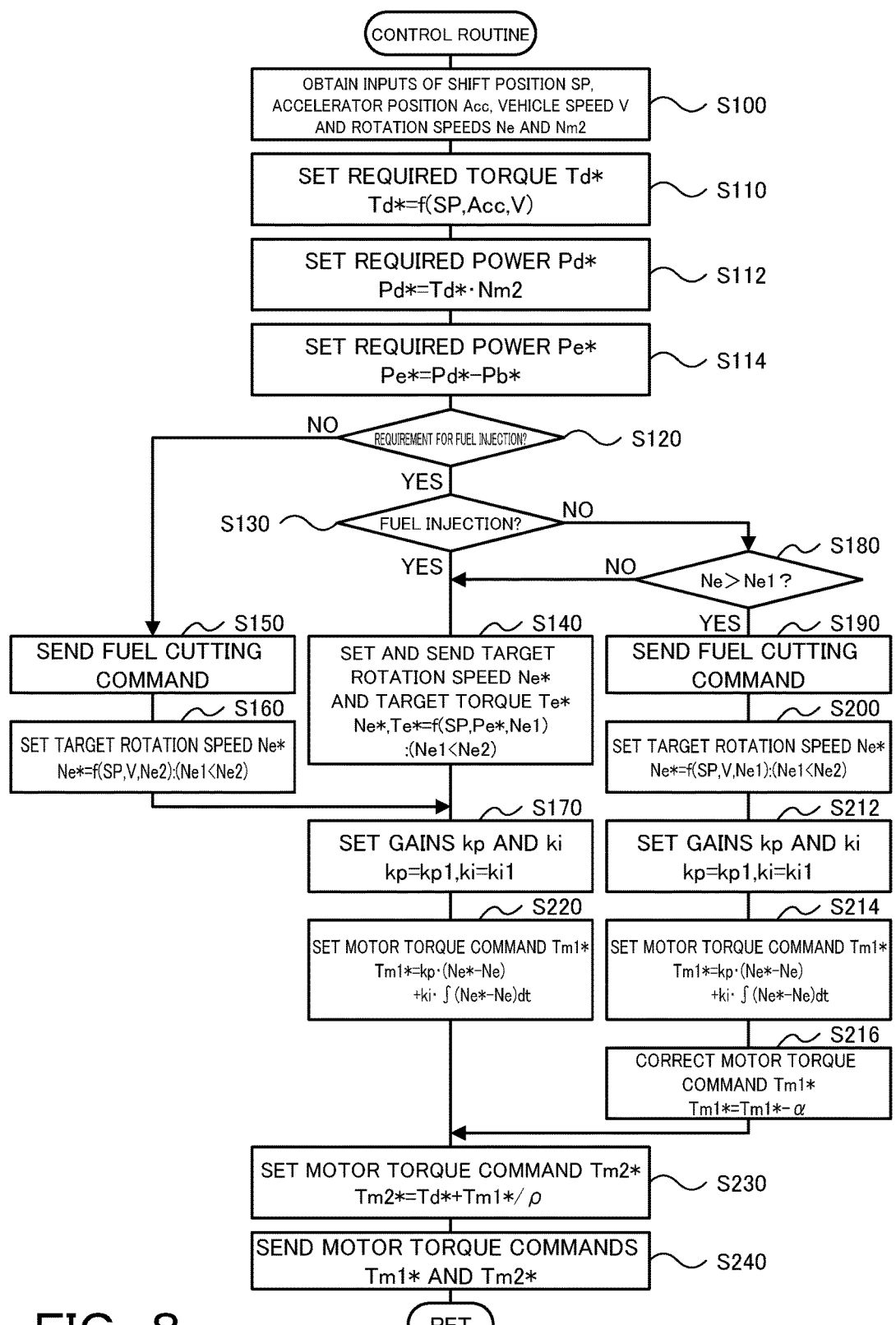
FIG. 8 is a flowchart showing one example of the control routine according to a modification.

In the hybrid vehicle 20 of the embodiment, the HVECU 70 performs the control routine of FIG. 3. According to a modification, the HVECU 70 may perform a control routine of FIG. 8, in place of the control routine of FIG. 3. The control routine of FIG. 8 is similar to the control routine of FIG. 3, except that the processing of step S210 is replaced by the processing of step S212 and that the processing of steps S214 and S216 is added. The like processing steps are expressed by the like step numbers, and their detailed description is omitted.

In the control routine of FIG. 8, the HVECU 70 sets the target rotation speed Ne* of the engine 22 at step S200 and subsequently sets the gains kp and ki of the proportional and the integral term in rotation speed feedback control and the torque command Tm1* of the motor MG1 (steps S212 and S214) by the same processing as the processing of steps S170 and S210. The HVECU 70 subsequently corrects the torque command Tm1* of the motor MG1 by subtracting a positive correction value α from the torque command Tm1* of the motor MG1 set at step S214 (step S216), performs the processing of steps S230 and S240 and then terminates this control routine.

The correction value α used may be a fixed value or may be a value approaching the value 0 (decreasing as the absolute value) with elapse of time or with a decrease in rotation speed Ne of the engine 22 (i.e., with a decrease in difference between the rotation speed Ne and the upper limit rotation speed Ne1).

The corrected torque command Tm1* of the motor MG1 obtained by the processing of step S216 is a larger value on the negative side (i.e., on the side of decreasing the rotation speed Ne of the engine 22), compared with the torque command Tm1* prior to the correction. This increases the amount of reduction in rotation speed Ne of the engine 22 per unit time, compared with a configuration that does not correct the torque command Tm1* of the motor MG1. This accordingly shortens the time period before the rotation speed Ne of the engine 22 becomes equal to or lower than the upper limit rotation speed Ne1, i.e., the time period before fuel injection of the engine 22 is allowed. As a result, this modification has similar advantageous effects to those of the embodiment.

Figure 9:
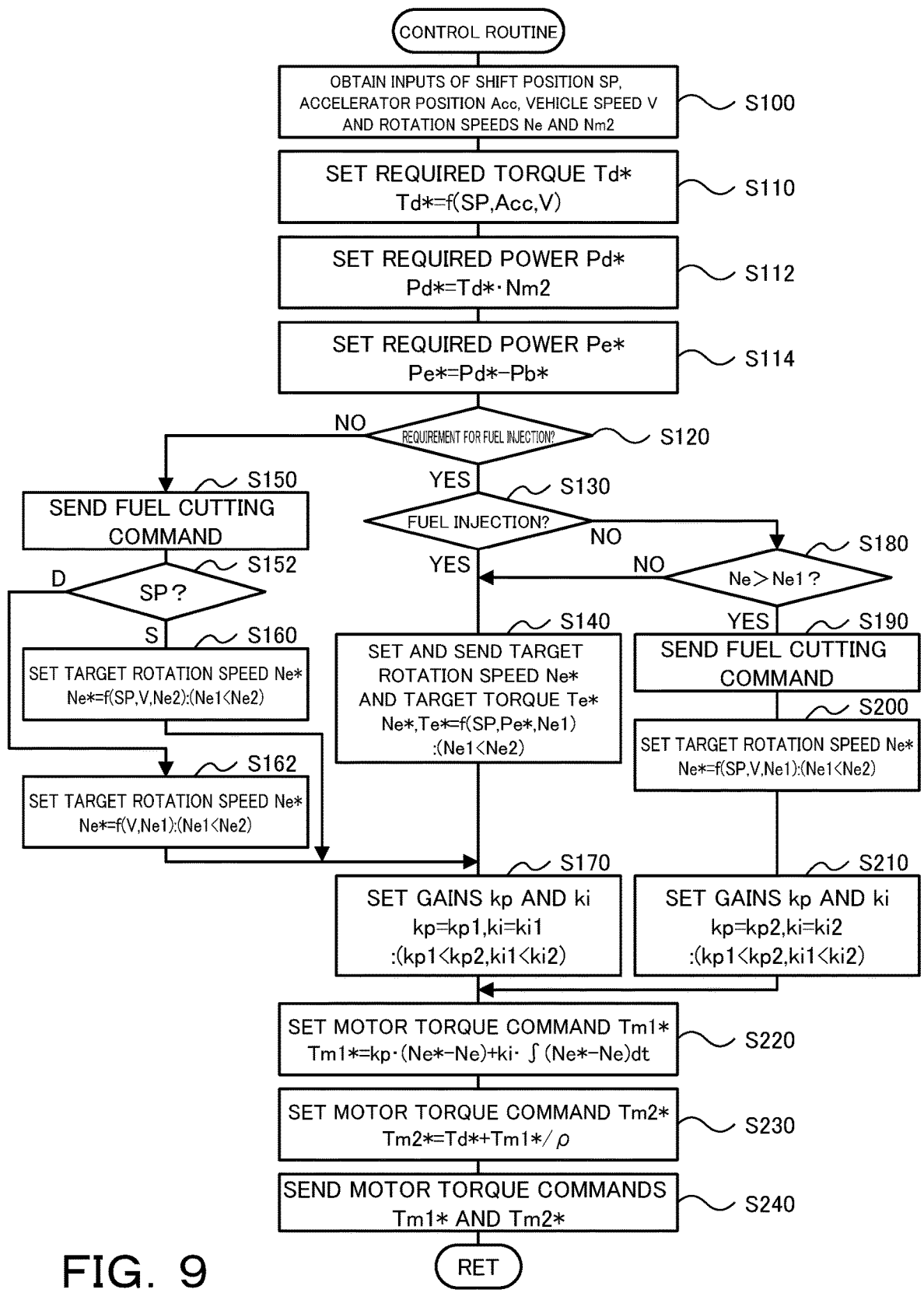
FIG. 9 is a flowchart showing one example of the control routine according to another modification.

In the hybrid vehicle 20 of the embodiment, the HVECU 70 performs the control routine of FIG. 3. According to a modification, the HVECU 70 may perform a control routine of FIG. 9, in place of the control routine of FIG. 3. The control routine of FIG. 9 is similar to the control routine of FIG. 3, except that the processing of steps S152 and S162 is added. The like processing steps are expressed by the like step numbers, and their detailed description is omitted.

In the control routine of FIG. 9, the HVECU 70 sends the fuel cutting command to the engine ECU 24 at step S150 and subsequently determines whether the shift position SP is the D position or the S position (step S152). When it is determined that the shift position SP is the S position, the HVECU 70 performs the processing of step S160, step S170 and steps S220 to S240 described above and then terminates this control routine. When it is determined that the shift position SP is the D position, on the other hand, the HVECU 70 sets the target rotation speed Ne* of the engine 22 in the range of not higher than the upper limit rotation speed Ne1, based on the vehicle speed V (step S162), performs the processing of step S170 and steps S220 to S240 and then terminates this control routine.

When the shift position SP is the D position, motoring the engine 22 under fuel cutting by the motor MG1 at a rotation speed that is equal to or lower than the upper limit rotation speed Ne1 allows for an immediate start of fuel injection of the engine 22 in response to a subsequent requirement for fuel injection of the engine 22. This modified configuration further suppresses the driver from feeling slow. When the shift position SP is the S position, this modified configuration has similar advantageous effects to those of the embodiment.

In the hybrid vehicle 20 of the embodiment, the six-speed transmission is provided as the virtual speed change gear. The number of speeds in the virtual speed change gear is, however, not limited to the six speeds but may be three speeds, four speeds, five speeds, seven speeds, eight speeds, nine speeds or ten speeds.

The hybrid vehicle 20 of the embodiment uses the battery 50 as the power storage device. The power storage device used may, however, be a capacitor, instead of the battery 50.

The hybrid vehicle 20 of the embodiment is provided with the engine ECU 24, the motor ECU 40, the battery ECU 52 and the HVECU 70. At least two of these ECUs may be configured as one single electronic control unit.

In the hybrid vehicle of this aspect, the control device may control the first motor such as to increase an amount of reduction in rotation speed of the engine per unit time until the rotation speed of the engine becomes equal to or lower than the upper limit rotation speed at the time of the predetermined request, compared with the amount of reduction after the rotation speed of the engine becomes equal to or lower than the upper limit rotation speed. This configuration further shortens the time period before the rotation speed of the engine becomes equal to or lower than the upper limit rotation speed, at the time of the predetermined request.

In the hybrid vehicle of the above aspect that controls the first motor such as to increase the amount of reduction in rotation speed of the engine per unit time until the rotation speed of the engine becomes equal to or lower than the upper limit rotation speed at the time of the predetermined request, compared with the amount of reduction after the rotation speed of the engine becomes equal to or lower than the upper limit rotation speed, when there is a requirement for fuel injection of the engine, the control device may control the first motor with setting a torque command of the first motor by feedback control that causes the rotation speed of the engine to approach a target rotation speed that is equal to or lower than the upper limit rotation speed. Further, the control device may provide a larger gain in the feedback control before the rotation speed of the engine becomes equal to or lower than the upper limit rotation speed at the time of the predetermined request, compared with the gain provided after the rotation speed of the engine becomes equal to or lower than the upper limit rotation speed. This configuration provides the larger gain in feedback control. This increases the torque of the first motor on the side of decreasing the rotation speed of the engine and accordingly shortens the time period before the rotation speed of the engine becomes equal to or lower than the upper limit rotation speed.

In the hybrid vehicle of the above aspect that controls the first motor such as to increase the amount of reduction in rotation speed of the engine per unit time until the rotation speed of the engine becomes equal to or lower than the upper limit rotation speed at the time of the predetermined request, compared with the amount of reduction after the rotation speed of the engine becomes equal to or lower than the upper limit rotation speed, at the time of the predetermined request, after the rotation speed of the engine becomes equal to or lower than the upper limit rotation speed, the control device may control the first motor with setting a torque command of the first motor by feedback control that causes the rotation speed of the engine to approach a target rotation speed that is equal to or lower than the upper limit rotation speed. Further, until the rotation speed of the engine becomes equal to or lower than the upper limit rotation speed, the control device may control the first motor with using a corrected torque command obtained by adding a correction torque in a direction of decreasing the rotation speed of the engine to the torque command. This configuration increases the corrected torque command on the side of decreasing the rotation speed of the engine, compared with the torque command prior to the correction. This accordingly shortens the time period before the rotation speed of the engine becomes equal to or lower than the upper limit rotation speed.

In the hybrid vehicle of another aspect, at a time of fuel cutting of the engine, when a shift position is a sequential position, the control device may control the first motor such as to motor the engine in a range of not higher than a second upper limit rotation speed that is larger than the upper limit rotation speed. Further, when the shift position is not the sequential position, the control device may control the first motor such as to motor the engine in a range of not higher than the upper limit rotation speed. This configuration further increases the braking force that is applied to the driveshaft during fuel cutting of the engine at the shift position set to the sequential position. At the shift position that is not set to the sequential position, this configuration immediately starts (restarts) fuel injection of the engine, in response to a requirement for fuel injection of the engine during fuel cutting of the engine.

The following describes the correspondence relationship between the primary components of the embodiment and the primary components of the disclosure described in Summary. The engine 22 of the embodiment corresponds to the "engine", the motor MG1 corresponds to the "first motor", the planetary gear 30 corresponds to the "planetary gear", the motor MG2 corresponds to the "second motor", the battery 50 corresponds to the "power storage device", and the engine ECU 24, the motor ECU 40 and HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

What is claimed is:

1. A hybrid vehicle, comprising:
an engine;
a first motor;
a planetary gear including three rotational elements that are respectively connected with an output shaft of the engine, a rotating shaft of the first motor and a driveshaft which is coupled with an axle;
a second motor configured to input and output power to and from the driveshaft;
a power storage device configured to transmit electric power to and from the first motor and the second motor; and
a control device,
wherein at a time of a predetermined request that requires fuel injection of the engine in a state of motoring the engine under fuel cutting by the first motor at a rotation speed that is higher than an upper limit rotation speed during fuel injection of the engine, the control device waits until rotation speed of the engine becomes equal to or lower than the upper limit rotation speed and then starts fuel injection of the engine, and
at the time of the predetermined request, the control device causes the rotation speed of the engine to be decreased by the first motor until the rotation speed of the engine becomes equal to or lower than the upper limit rotation speed.

2. The hybrid vehicle according to claim 1,
wherein the control device controls the first motor such as to increase an amount of reduction in rotation speed of the engine per unit time until the rotation speed of the engine becomes equal to or lower than the upper limit rotation speed at the time of the predetermined request, compared with the amount of reduction after the rotation speed of the engine becomes equal to or lower than the upper limit rotation speed.

3. The hybrid vehicle according to claim 2,
wherein when there is a requirement for fuel injection of the engine, the control device controls the first motor with setting a torque command of the first motor by feedback control that causes the rotation speed of the engine to approach a target rotation speed that is equal to or lower than the upper limit rotation speed, and
the control device provides a larger gain in the feedback control before the rotation speed of the engine becomes equal to or lower than the upper limit rotation speed at the time of the predetermined request, compared with the gain provided after the rotation speed of the engine becomes equal to or lower than the upper limit rotation speed.

4. The hybrid vehicle according to claim 2,
wherein at the time of the predetermined request,
after the rotation speed of the engine becomes equal to or lower than the upper limit rotation speed, the control device controls the first motor with setting a torque command of the first motor by feedback control that causes the rotation speed of the engine to approach a target rotation speed that is equal to or lower than the upper limit rotation speed, and
until the rotation speed of the engine becomes equal to or lower than the upper limit rotation speed, the control device controls the first motor with using a corrected torque command obtained by adding a correction torque in a direction of decreasing the rotation speed of the engine to the torque command.

5. The hybrid vehicle according to claim 1,
wherein at a time of fuel cutting of the engine,
when a shift position is a sequential position, the control device controls the first motor such as to motor the engine in a range of not higher than a second upper limit rotation speed that is larger than the upper limit rotation speed, and when the shift position is not the sequential position, the control device controls the first motor such as to motor the engine in a range of not higher than the upper limit rotation speed.

* * * * *